US009208236B2

(12) United States Patent
Nagaralu et al.

(10) Patent No.: US 9,208,236 B2
(45) Date of Patent: Dec. 8, 2015

(54) PRESENTING SEARCH RESULTS BASED UPON SUBJECT-VERSIONS

(75) Inventors: Sree Hari Nagaralu, Hyderabad (IN); Puneet Agrawal, Hyderabad (IN); Adish Kumar Singla, Seattle, WA (US); Vijay Krishnan, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 272 days.

(21) Appl. No.: 13/309,056

(22) Filed: Dec. 1, 2011

(65) Prior Publication Data

US 2013/0097156 A1    Apr. 18, 2013

(30) Foreign Application Priority Data

Oct. 13, 2011  (IN) .......................... 2950/DEL/2011

(51) Int. Cl.
*G06F 17/30* (2006.01)
(52) U.S. Cl.
CPC .... *G06F 17/30867* (2013.01); *G06F 17/30731* (2013.01)
(58) Field of Classification Search
CPC ................... G06F 17/30731; G06F 17/30867; Y10S 707/99933; Y10S 707/99945
USPC ......................................... 707/723, 772, 226
See application file for complete search history.

(56) References Cited

U.S. PATENT DOCUMENTS 6,647,380 B1   11/2003  Yotsukura
6,694,328 B1    2/2004  Bennett (Continued)

FOREIGN PATENT DOCUMENTS

CN    1535433 A    10/2004
CN    101408879 A    4/2009
KR    100797041 B1   1/2008

OTHER PUBLICATIONS

Wang, et al., "Intent Boundary Detection in Search Query Logs", In Proceeding of the 33rd International ACM SIGIR Conference on Research and Development in Information Retrieval, Jul. 19-23, 2010, pp. 749-750.
International Search Report with Written Opinion dated Mar. 28, 2013, 9 pages.
"First Office Action and Search Report Issued in Chinese Patent Application No. 201210388726.8", Mailed Date: Dec. 18, 2014, 13 Pages.

*Primary Examiner* — Sheree Brown
(74) *Attorney, Agent, or Firm* — Dave Ream; Jim Ross; Micky Minhas (57) ABSTRACT

Systems, methods, and computer-readable storage media for identifying queries having a version-intent and presenting search results in accordance with the version-intent are provided. Subject-versions associated with retrievable documents are identified and associated therewith as subject-version tags. When a search query is received, it is determined whether the query has a version-intent indicative of a particular version associated with a subject of the query. Documents are retrieved that satisfy the input query and ranked for presentation based upon the particular subject-version indicated by the version-intent. The ranked documents are then presented. Also presented is a user-manipulatable tool, manipulation of which permits a user to indicate that information concerning a different subject-version is desired. Upon receiving such indication, the search results are changed such that documents having subject-version tags indicative of the newly-indicated version-intent are ranked higher and receive more prominent placement than documents lacking such subject-version tags.

20 Claims, 7 Drawing Sheets

(56) References Cited

U.S. PATENT DOCUMENTS

| | | |
|---|---|---|
| 7,603,348 B2 | 10/2009 | He et al. |
| 7,991,891 B2 * | 8/2011 | Kelly et al. .................... 709/226 |
| 8,484,378 B2 * | 7/2013 | Kelly et al. .................... 709/245 |
| 8,954,434 B2 * | 2/2015 | Ahn et al. ..................... 707/737 |
| 2005/0108200 A1 | 5/2005 | Meik |
| 2005/0222976 A1 | 10/2005 | Pfleger |
| 2007/0192314 A1 | 8/2007 | Heggem |
| 2007/0266002 A1 | 11/2007 | Chowdhury et al. |
| 2008/0033970 A1 | 2/2008 | Jones et al. |
| 2008/0082578 A1 * | 4/2008 | Hogue et al. ............... 707/104.1 |
| 2008/0243787 A1 * | 10/2008 | Stading ........................... 707/3 |
| 2008/0250012 A1 * | 10/2008 | Hinckley et al. .................. 707/5 |
| 2009/0125490 A1 * | 5/2009 | Newbold et al. .................. 707/3 |
| 2009/0125542 A1 | 5/2009 | Loeser et al. |
| 2009/0271179 A1 * | 10/2009 | Marchisio et al. ................ 704/9 |
| 2009/0299965 A1 | 12/2009 | Aziz et al. |
| 2010/0131538 A1 | 5/2010 | Jones et al. |
| 2010/0205180 A1 | 8/2010 | Cooper et al. |
| 2011/0173210 A1 * | 7/2011 | Ahn et al. ..................... 707/748 |
| 2011/0208715 A1 | 8/2011 | Ni et al. |
| 2011/0225190 A1 * | 9/2011 | Kelly et al. .................... 707/772 |

* cited by examiner

PRESENTING SEARCH RESULTS BASED UPON SUBJECT-VERSIONS

CROSS-REFERENCE TO RELATED APPLICATIONS

This application claims the benefit of Indian Patent Application No. 2950/DEL/2011 filed Oct. 13, 2011, which application is incorporated by reference as if set forth in its entirety herein.

BACKGROUND

Users often submit keyword-based queries to search engines in search of desired information. In response to receiving such queries, search engines identify those documents determined to most closely satisfy the query, rank the identified documents based upon keyword-based relevance and present a ranked listing of documents to the user. Those documents of higher ranking are determined to be more relevant and thus receive more prominent placement (e.g., at or toward the top of a vertical listing). While search engines strive to return the most relevant and desired results, there is any number of reasons why the documents returned may be unsatisfactory to the user. One such reason is that a subject of an input search query may have various versions and the results returned, while satisfying the keyword-based subject of the query, may fail to provide information about the desired version.

Many entities (or query subjects) have multiple versions and versions can differ based upon the nature of the entity. For instance, many car models are released every year and each year's model may be viewed as a different version (e.g., HONDA ACCORD 2010 and HONDA ACCORD 2011). Similarly, many events occur at regular intervals and each interval may be viewed as a different version (e.g., NBA Playoffs 2009 and NBA Playoffs 2010). Additionally, some products, for instance software products, use different numerical designations to indicate different versions (e.g., INTERNET EXPLORER 8 and INTERNET EXPLORER 9). There are also queries which, while having a specific version denoted, do so in a relative rather than a fixed manner. For instance, a query may indicate "events in Seattle tomorrow." "Tomorrow" is the particular version designated but the value of the designation changes with time and results relevant today will differ from those relevant based on the same query tomorrow.

Query subjects having multiple versions can lead to unsatisfactory search results. For instance, users often input only the subject of the versions (e.g., "HONDA ACCORD") without an accompanying indication for which version they would like to see results. Additionally, even if the user enters a version-intent (that is, a designation of a particular version within the search query itself), the version may be only one of multiple keywords upon which results are ranked and, as such, results closely matching other portions of the query may appear more prominently, or instead of, results that include information about the desired version.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, creating and associating subject-version tags with searchable documents, identifying search queries that have an associated version-intent and presenting results to such search queries in accordance with the associated version-intent. Each document of a corpus of documents that is searchable and retrievable in response to a search query is examined to determine any subject-versions associated therewith. If subject-versions are determined, such information is stored in association with the appropriate documents as subject-version tags. When a search query is received, it is determined whether at least a portion of the search query has a version-intent indicative of a particular version associated with a subject of the search query. Such version-intent may be explicitly provided or implicitly derived from the query. Documents are retrieved that satisfy the input query and ranked for presentation, at least in part, based upon the particular version indicated by the version-intent as compared to the subject-version tags associated with the satisfying documents. The ranked documents are then presented in response to the search query. Also presented is a user-manipulatable tool, manipulation of which permits a user to indicate that information concerning a different subject-version is desired. Upon receiving such indication, the search results are changed such that documents having subject-version tags indicative of the newly-indicated version-intent are ranked higher and receive more prominent placement than documents lacking such subject-version tags and/or documents associated with different subject-version tags.

BRIEF DESCRIPTION OF THE DRAWINGS

The present invention is illustrated by way of example and not limited in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, creating and associating subject-version tags with searchable documents, identifying search queries that have an associated version-intent and presenting results to such search queries in accordance with the associated version-intent. Each document of a corpus of documents that is searchable and retrievable in response to a search query is examined to determine any subject-versions associated therewith. If subject-versions are determined, such information is stored in association with the appropriate documents as subject-version tags. When a search query is received, it is determined whether at least a portion of the search query has a version-intent indicative of a particular version associated with a subject of the search query. Such version-intent may be explicitly provided or implicitly derived from the query. Documents are retrieved that satisfy the input query and ranked for presentation, at least in part, based upon the particular version indicated by the version-intent as compared to the subject-version tags associated with the satisfying documents. The ranked documents are then presented in response to the search query. Also presented is a user-manipulatable tool, manipulation of which permits a user to indicate that information concerning a different subject-version is desired. Upon receiving such indication, the search results are changed such that documents having subject-version tags indicative of the newly-indicated version-intent are ranked higher and receive more prominent placement than documents lacking such subject-version tags and/or documents having different subject-version tags.

Accordingly, one embodiment of the present invention is directed to one or more computer-readable storage media storing computer-useable instructions that, when used by one or more computing devices, cause the one or more computing devices to perform a method for identifying queries having a version-intent and presenting search results in accordance with the version-intent. The method includes receiving a search query and determining that at least a portion of the received search query has a version-intent indicative of a particular version associated with a subject of the search query. The method further includes presenting a plurality of search results that are ranked for presentation, at least in part, based on the particular subject-version indicated by the version-intent. Also presented is a user-manipulatable tool, manipulation of which permits a user to change the version-intent to be indicative of a version associated with the subject of the search query other than the particular version.

Another embodiment of the present invention is directed to a method performed by a computing device having a processor and a memory for classifying documents for presentation in response to search queries having associated version-intents. The method includes classifying each document of a plurality of documents for keyword-based retrieval in response to a received search query and determining, for each classified document, whether any subject-versions are indicated. For each document having at least one indicated subject-version, the method further includes creating a tag indicative of the at least one indicated subject-version. For each classified document, the method further includes storing a document identifier, the document classification information and any associated subject-version tags in a document index.

In yet another embodiment, the present invention is directed to one or more computer-readable storage media storing computer-useable instructions that, when used by one or more computing devices, cause the one or more computing devices to perform a method for identifying queries having a version-intent and presenting search results in accordance with the version-intent. The method includes receiving a search query; determining that at least a portion of the search query has a version-intent indicative of a particular version associated with a subject of the search query; extracting, from the search query, the particular subject-version associated with the subject thereof; identifying a plurality of subject-versions associated with the subject of the search query, wherein the plurality includes the particular subject-version extracted from the search query; determining one or more documents that satisfies the received search query, wherein at least a portion of the one or more documents has one or more subject-version tags associated therewith; and presenting a plurality of search results that are ranked for presentation, at least in part, based on the particular subject-version indicated by the version-intent.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 1:
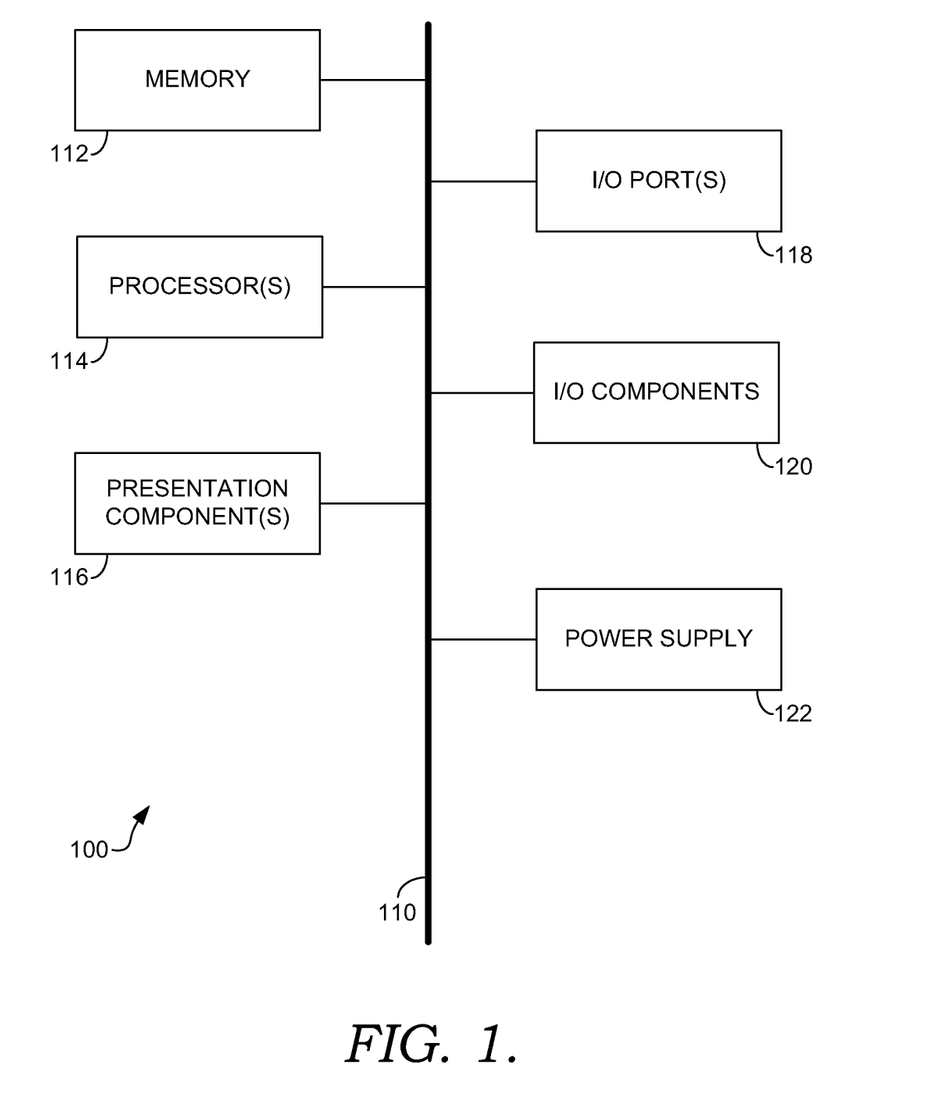
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously mentioned, embodiments of the present invention relate to systems, methods, and computer-readable storage media for, among other things, creating and associating subject-version tags with searchable documents, identifying search queries that have an associated version-intent and presenting results to such search queries in accordance with the associated version-intent. Each document of a corpus of documents that is searchable and retrievable in response to a search query is examined to determine any subject-versions associated therewith. If subject-versions are determined, such information is stored in association with the appropriate documents as subject-version tags. When a search query is received, it is determined whether at least a portion of the search query has a version-intent indicative of a particular version associated with a subject of the search query. Such version-intent may be explicitly provided or implicitly derived from the query. Documents are retrieved that satisfy the input query and ranked for presentation, at least in part, based upon the particular version indicated by the version-intent as compared to the subject-version tags associated with the satisfying documents. The ranked documents are then presented in response to the search query. Also presented is a user-manipulatable tool, manipulation of which permits a user to indicate that information concerning a different subject-version is desired. Upon receiving such indication, the search results are changed such that documents having subject-version tags indicative of the newly-indicated version-intent are ranked higher and receive more prominent placement than documents lacking such subject-version tags and/or documents having different subject-version tags.

Figure 2:
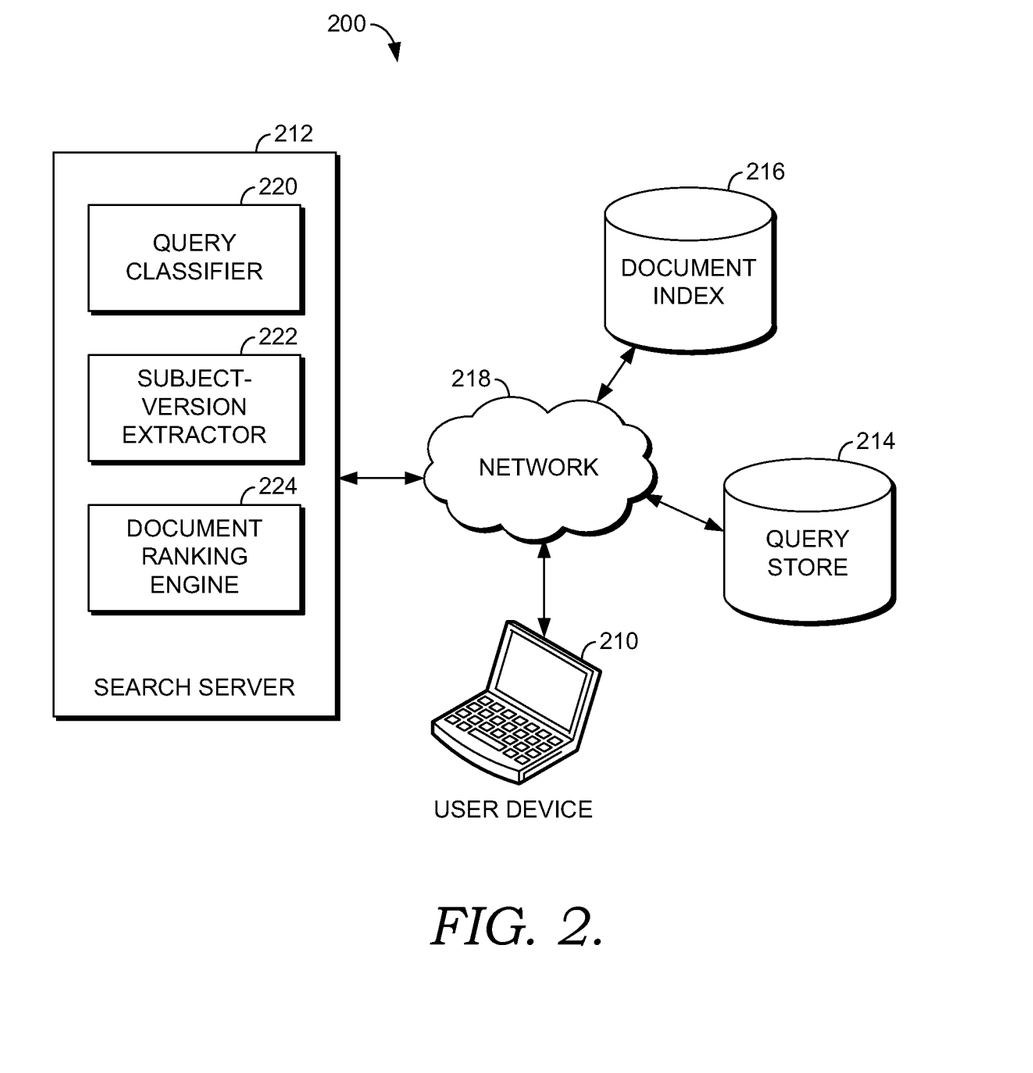
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which documents (e.g., Web documents) are tagged with information indicative of one or more versions of a subject thereof, queries are identified as having a particular version-intent, and (document) results of search queries are ranked, in part, based on subject-version tags associated therewith. As will be described in further detail below, embodiments of the present invention provide systems and methods for identifying search queries that have an associated version-intent and presenting results to such search queries in accordance with the associated version-intent.

Among other components not shown, the computing system 200 generally includes a user computing device 210, a search server 212, a query store 214 and a document index 216, all in communication with one another via a network 218. The network 218 may include, without limitation, one or more local area networks (LANs) and/or wide area networks (WANs). Such networking environments are commonplace in offices, enterprise-wide computer networks, intranets and the Internet. Accordingly, the network 218 is not further described herein.

It should be understood that any number of user computing devices, search servers and data stores (e.g., query store 214 and document index 216) may be employed in the computing system 200 within the scope of embodiments of the present invention. Each may comprise a single device/interface or multiple devices/interfaces cooperating in a distributed environment. For instance, the search server 212 may comprise multiple devices and/or modules arranged in a distributed environment that collectively provide the functionality of the search server 212 described herein. Additionally, other components/modules not shown may also be included within the computing system 200.

In some embodiments, one or more of the illustrated components/modules may be implemented as stand-alone applications. In other embodiments, one or more of the illustrated components/modules may be implemented via the user computing device 210, as an Internet-based service, or as a module inside the search server 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers or user computing devices. By way of example only, the search server 212 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 210 may include any type of computing device, such as the computing device 100 described with reference to FIG. 1, for example. Generally, the user computing device 210 includes a browser (not shown) and a display (not shown). The browser is configured to receive user inputted search queries (generally inputted via a user interface presented on the display and permitting alpha-numeric and/or textual input into a designated search box) and to receive content for presentation on the display, for instance, from the search server 212. It should be noted that the functionality described herein as being performed by the browser may be performed by any other application capable of rendering Web content. Any and all such variations, and any combination thereof, are contemplated to be within the scope of embodiments of the present invention.

The search server 212 is configured to receive and respond to requests that it receives from components associated with user computing devices, for instance, the browser (not shown) associated with the user computing device 210. The search server 212 may be associated with any search engine capable of searching text and/or content. Those skilled in the art will recognize that the present invention may be implemented with any number of searching utilities. For example, an Internet search engine or a database search engine may utilize the present invention. These search engines are well known in the art, and commercially available engines share many similar processes not further described herein.

As illustrated, the search server 212 includes a query classifier 220, a subject-version extractor 222, and a document ranking engine 224. The illustrated search server 212 also has access to a query store 214 and a document index 216. The query store 214 is configured to store search queries having an associated version-intent in association with such version-intent. A subject (that is, a topic or keyword) of an inputted search query may have multiple versions thereof. For instance, many car models are released every year and each year's model may be viewed as a different version (e.g., HONDA ACCORD 2010 and HONDA ACCORD 2011). Similarly, many events occur at regular intervals and each interval may be viewed as a different version (e.g., NBA Playoffs 2009 and NBA Playoffs 2010). Additionally, some products, for instance software products, use different numerical designations to indicate different versions (e.g., INTERNET EXPLORER 8 and INTERNET EXPLORER 9). There are also queries which, while having a specific version denoted, do so in a relative rather than a fixed manner. For instance, a query may indicate "events in Seattle tomorrow." In this instance, "tomorrow" is the particular version designated but the value of the designation changes with time and results relevant today will differ from those relevant based on the same query tomorrow.

Figure 3:
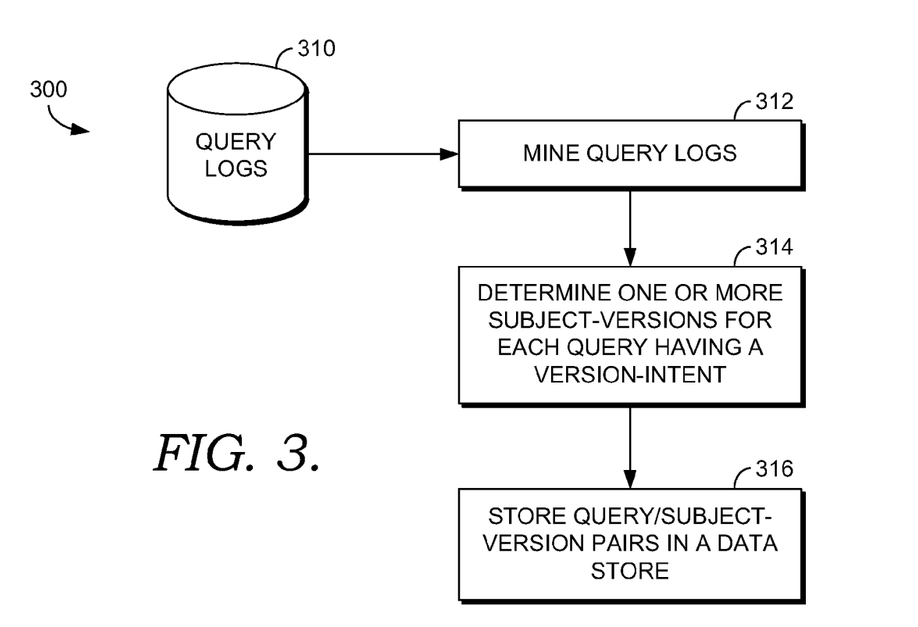
FIG. 3 is a flow diagram showing an exemplary method for creating a query store containing subject-version information, in accordance with an embodiment of the present invention.

With reference to FIG. 3, a flow diagram is provided that illustrates an exemplary method 300 for creating a query store (e.g., query store 214 of FIG. 2) containing version-intent information, in accordance with an embodiment of the present invention. Initially, as indicated at block 312, query logs 310 are mined to determine queries having a version-intent, that is, queries having at least one subject with a plurality of associated versions. Such determinations may be made, for instance, by comparison of original queries and reformulated queries inputted by users. For a simplistic example, see Tables I and II below which illustrate exemplary query log data.

TABLE I

| | Query | Reformulated Query | Query Frequency | Reformulated Query Frequency | Abandonment Rate |
|---|---|---|---|---|---|
| 1 | HONDA ACCORD | HONDA ACCORD 2010 FIYAT LISTESI | 157703 | 16 | 50.00% |
| 2 | HONDA ACCORD | HONDA ACCORD MALAYSIA 2010 | 157703 | 29 | 57.14% |
| 3 | HONDA ACCORD | NEW HONDA ACCORD 2010 | 157703 | 163 | 20.00% |
| 4 | HONDA ACCORD | HONDA ACCORD 2010 PICTURES | 157703 | 88 | 0.00% |
| 5 | HONDA ACCORD | HONDA ACCORD 2010 lx | 157703 | 32 | 33.33% |
| 6 | HONDA ACCORD | HONDA ACCORD PRICE IN INDIA 2010 | 157703 | 3 | 66.67% |
| 7 | HONDA ACCORD | 2010 HONDA ACCORD CROSSTOUR | 157703 | 401 | 25.00% |
| 8 | HONDA ACCORD | HONDA ACCORD TEST 2010 | 157703 | 17 | 66.67% |
| 9 | HONDA ACCORD | HONDA ACCORD PRICES 2010 | 157703 | 21 | 0.00% |
| 10 | HONDA ACCORD | HONDA ACCORD 2010 PRICE | 157703 | 290 | 33.33% |

TABLE II

| | Query | Reformulated Query | Query Frequency | Reformulated Query Frequency | Abandonment Rate |
|---|---|---|---|---|---|
| 1 | HONDA ACCORD | 2011 HONDA ACCORD REVIEW | 157703 | 466 | 33.33% |
| 2 | HONDA ACCORD | 2011 HONDA ACCORD COUPE | 157703 | 1442 | 5.26% |
| 3 | HONDA ACCORD | HONDA ACCORD 2011 lx | 157703 | 19 | 0.00% |
| 4 | HONDA ACCORD | HONDA ACCORD PRECIOS 2011 | 157703 | 16 | 75.00% |
| 5 | HONDA ACCORD | HONDA ACCORD NEW MODEL 2011 | 157703 | 33 | 66.67% |
| 6 | HONDA ACCORD | HONDA ACCORD 2011 FIYAT LISTESI | 157703 | 79 | 50.00% |
| 7 | HONDA ACCORD | HONDA ACCORD 2011 | 157703 | 77 | 50.00% |
| 8 | HONDA ACCORD | 2011 HONDA ACCORD LISTINGS | 157703 | 6 | 0.00% |
| 9 | HONDA ACCORD | HONDA ACCORD 2011 | 157703 | 174 | 7.78% |
| 10 | HONDA ACCORD | HONDA ACCORD NEW FACELIFT 2011 | 157703 | 7 | 0.00% |

In each table, the column entitled "Query" denotes exemplary data for a query inputted as shown by a collective group of users. The column entitled "Query Frequency" denotes that the query "HONDA ACCORD" was inputted by users 157,703 times during the examined time frame. The column entitled "Reformulated Query" denotes exemplary data showing that, if the user inputting the query does not receive desired results, he or she may reformulate the query as shown. The column entitled "Reformulated Query Frequency" denotes the number of times a user reformulated the query "HONDA ACCORD" in accordance with the reformulated queries shown. The final column entitled "Abandonment Rate" denotes the percentage of the time that users abandon the search even after reformulating the query as shown.

From the table data, it can be seen that the query "HONDA ACCORD" contains frequent query reformulations that repeat themselves excepting the designation of a different year (i.e., version). For instance, row 5 of Table I and row 3 of Table II represent the same reformulations absent the year (i.e., version) of the HONDA ACCORD model. Similarly, row 1 of Table I and row 6 of Table II represent the same reformulations absent the year (i.e., version) of the HONDA ACCORD FIYAT LISTESI model. Given this data, it can be discerned that the inputted queries "HONDA ACCORD 2010," "HONDA ACCORD 2011," "HONDA ACCORD 2010 FIYAT LISTESI," and "HONDA ACCORD 2011 FIYAT LISTESI" are queries with a particular version-intent. Similarly, though no specific version-intent is indicated in the query itself, it can also be discerned that the query "HONDA ACCORD" is a query for which a version-intent is present as it is clear that multiple versions of HONDA ACCORD exist.

Returning to FIG. 3, for each query determined to have a version-intent, one or more subject versions is identified or determined. For instance, in the above, "2010," "2011," "2010 FIYAL LISTESI," and "2011 FIYAT LISTESI" may all be determined or identified as subject-versions for the query "HONDA ACCORD." Each query determined to have a version-intent then is stored in a query store (e.g., the query store 214 of FIG. 2) with its associated one or more subject-versions. This is indicated at block 316.

As can also be seen in Tables I and II, queries may contain query strings that explicitly indicate a version-intent. For instance, the reformulated queries "HONDA ACCORD 2010" or "HONDA ACCORD 2011" contain query strings that explicitly indicate the version-intent, namely "2010" and "2011," respectively. Alternatively, queries may contain query strings that implicitly indicate a version-intent and from which a particular version may be derived or presumed. For instance, as previously described, the query "HONDA ACCORD" is a query for which a version-intent is present as it is clear that multiple versions of HONDA ACCORD exist. However, no explicit version-intent information is set forth in the query itself. In accordance with embodiments of the present invention, where an implicit version-intent is indicated, the latest or most recent version of the subject of the query is presumed to be the particular version for which information is desired. It will be understood by those of ordinary skill in the art that any number of criteria may be utilized to derive or presume an implicit version-intent and such is not intended to limit the scope of embodiments hereof. For instance, the presumed version may be the most frequently associated version of the subject based upon query log data, or the like. In embodiments, the aim is to ensure fair treatment for documents having an established subject-version that matches the version-intent of a query and documents having no established subject-version associated therewith.

There are also queries which, while having a specific version denoted, do so in a relative rather than a fixed manner. For instance, a query may indicate "events in Seattle tomorrow," where "tomorrow" is the designated version-intent but the value of the designation changes with time such that results relevant today will differ from those relevant based on the same query inputted on a different day. In accordance with embodiments of the present invention, query stings that are indicative of a relative version-intent are identified (e.g., through comparison to a listing of common relative terms stored in association with the query store 214 of FIG. 2) and assigned a fixed version for purposes of identifying and ranking search results, as more fully described below. For instance, if the query "events in Seattle tomorrow" is inputted on January $1^{st}$, "tomorrow" may be identified as a relative version designation and assigned the version "January $2^{nd}$" prior to rendering the search results.

With reference back to FIG. 2, in embodiments, the query store 214 is configured to be searchable for one or more of the items stored in association therewith. It will be understood and appreciated by those of ordinary skill in the art that the information stored in association with the query store 214 may be configurable and may include any information relevant to queries and their associated version-intents. The content and volume of such information are not intended to limit the scope of embodiments of the present invention in any way. Further, though illustrated as a single, independent component, the query store 214 may, in fact, be a plurality of storage devices, for instance a database cluster, portions of which may reside in association with the search server 212, the user computing device 210, another external computing device (not shown), and/or any combination thereof.

The document index 216 is configured to store an index of document identifiers, their associated keyword-based classification information and any associated version information associated with any subjects thereof. Just as a subject (that is, a topic or keyword) of an inputted query may have multiple versions thereof, subjects of documents that may be retrieved in response to inputted search queries may similarly have one or more associated versions. As such, designations that retrievable documents contain information about subjects having multiple versions, as well as to which version or versions such information pertains, are determined and indications of such are stored in the document index 216.

Figure 4:
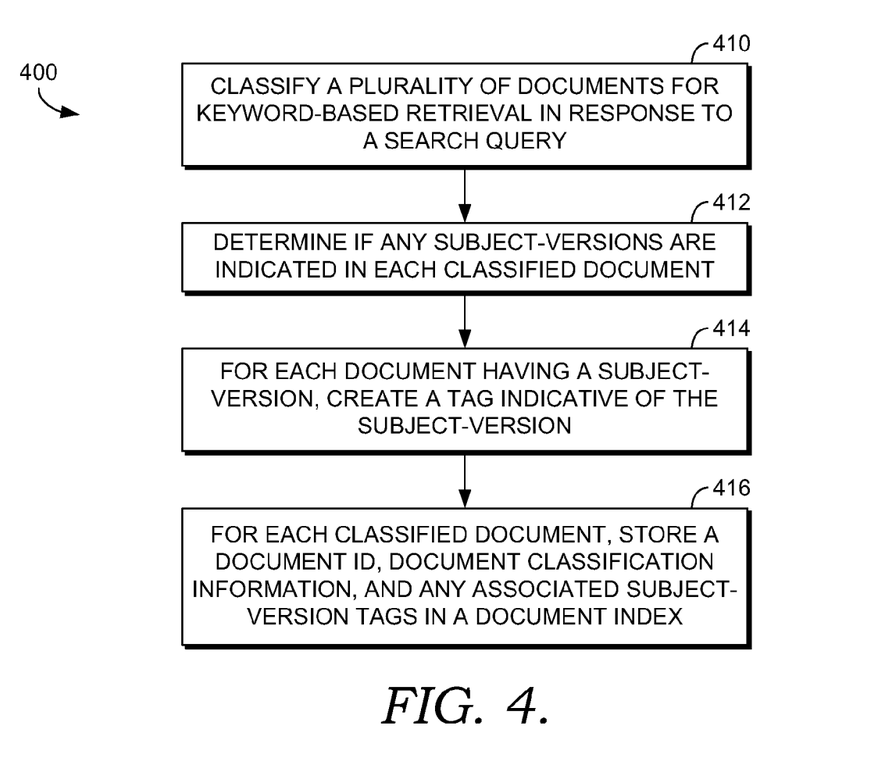
FIG. 4 is a flow diagram showing an exemplary method for tagging documents with version information, in accordance with an embodiment of the present invention.

With reference to FIG. 4, a flow diagram is provided that illustrates an exemplary method 400 for tagging documents (e.g., Web documents) with version information, in accordance with an embodiment of the present invention. As indicated at block 410, each of a plurality of documents is classified for keyword-based retrieval in response to received search queries. Techniques for keyword-based classification are known to those or ordinary skill in the art and, accordingly, are not further described herein. For each document, it is also determined if any subject-versions are indicated, as shown at block 412. Document subjects for which subject-versions may be present may be determined, e.g., by comparison of documents containing identical and/or similar keywords and determinations as to whether similar keywords exist with minor variations that may be attributable to versioning. For each document having one or more subject-versions, a tag (for instance, a metadata tag) indicative of each subject-version associated with the document is created. This is indicated at block 414. For each classified document, a document identifier (ID), the document classification information, and any associated subject-version tags are stored in a document index (e.g., document index 216 of FIG. 2), as indicated at block 416.

Documents having subjects determined to have multiple versions may be associated with zero, one, or multiple subject-version tags. For instance, a document about the car model HONDA ACCORD may discuss the car model generally but without specific information about any particular version or year. In this instance, such document, though associated with a subject having multiple versions, may not be associated with any subject-version tags. Alternatively, another document about the car model HONDA ACCORD may discuss the features of the 2010 model of HONDA ACCORD. In this instance, the document may be tagged with the subject-version tag "2010." Yet another document about the car model HONDA ACCORD may compare the features of the 2010 and 2011 models of HONDA ACCORD. In this instance, the document may be tagged with two subject-version tags, one for "2010" and one for "2011."

In embodiments, the document index 216 is configured to be searchable for one or more of the items stored in association therewith. It will be understood and appreciated by those of ordinary skill in the art that the information stored in association with the document index 216 may be configurable and may include any information relevant to documents that are capable of keyword-based retrieval and associated subject-version information. The content and volume of such information are not intended to limit the scope of embodiments of the present invention in any way. Further, though illustrated as a single, independent component, the document index 216 may, in fact, be a plurality of storage devices, for instance a database cluster, portions of which may reside in association with the search server 212, the user computing device 210, another external computing device (not shown), and/or any combination thereof.

Once a query has been received by the search server 212, the query classifier 220 is configured to examine the inputted search query and determine whether at least a portion of the search query has a version-intent indicative of a particular version associated with a subject thereof. Such determination may be made, for instance, by comparing the terms and/or phrases of the inputted search query with the information stored in the query store 214.

Once a query has been classified as having a version-intent, the subject-version extractor 222 is configured to extract the particular subject-version associated with a subject thereof. A subject-version associated with an inputted query may be explicit or implicit. An exemplary explicit query subject-version is found in the query "HONDA ACCORD 2011." The subject-version "2011" is explicitly contained in the search query itself and refers to the query subject "HONDA ACCORD." An exemplary implicit query subject-version is found in the query "HONDA ACCORD." As shown above in Tables I and II, the query "HONDA ACCORD" is determined to contain a version-intent as multiple versions of HONDA ACCORD exist. The fact that there is no explicit indication of a particular subject-version in the query renders the version-intent implicit. In embodiments of the present invention, such implicit version-intent defaults to a latest or most-recent version of the subject of the query. As such, if the query "HONDA ACCORD" is inputted by a user in March of 2011, the latest or most recent version of HONDA ACCORD is 2011 and the desired version-intent will be presumed to be such. It will be understood and appreciated by those of ordinary skill in the art that latest or most-recent versions are only one default categorization and any number of default positions may be established as desired.

The document ranking engine 224 is configured to rank documents determined to satisfy an inputted search query for presentation to the user. Generally, higher ranking documents are presented more prominently than lower ranking documents, for instance, at the top of a vertical results listing, or the like. Documents determined to satisfy an inputted search query based on the keywords contained therein are known in the art and techniques centered on keyword-based document retrieval are not further described herein. Rather than merely ranking documents based upon keywords, the document ranking engine 224 in accordance with embodiments of the present invention, utilizes tags associated with the satisfying documents to filter or rank the documents for presentation. The association of subject-version tags with documents was discussed herein above with reference to the document index 216 of FIG. 2 and the method 400 of FIG. 4. Utilizing the document ranking engine 224, satisfying documents having subject-version tags associated therewith that match (or closely approximate) a subject-version extracted from a received query (e.g., utilizing the subject-version extractor 222), are retrieved utilizing the document index 216 and may be ranked higher than documents that do not have such associated subject-version tags. Documents may then be presented in response to a received search query (e.g., in association with the user computing device 210) that take into account subject-versions of inputted search queries.

Figure 5:
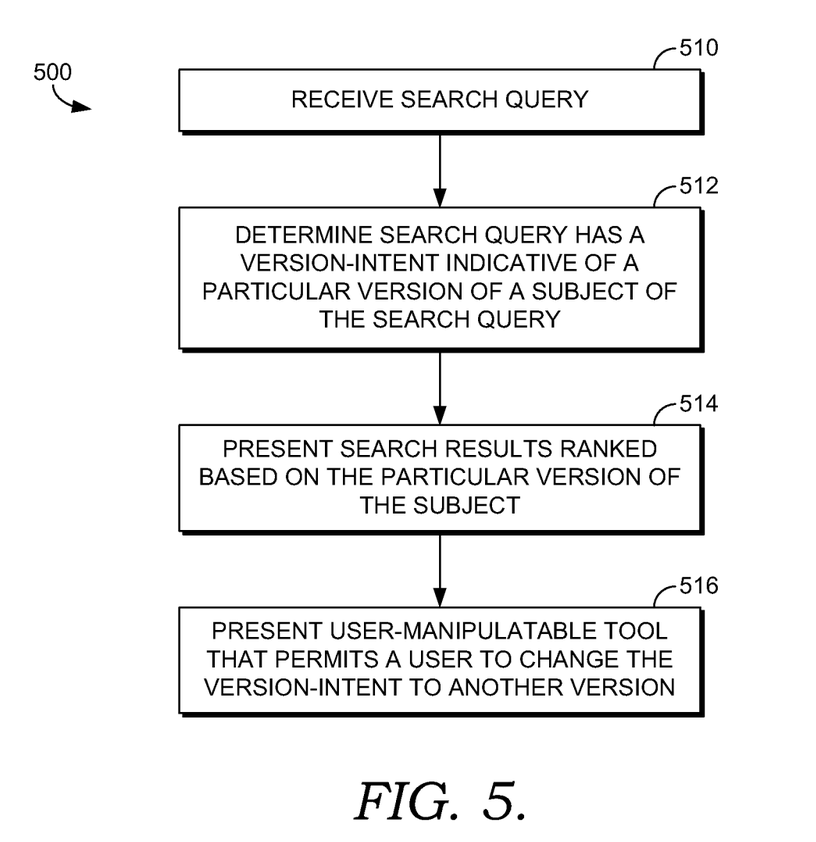
FIG. 5 is a flow diagram showing an exemplary method for identifying queries having a version-intent and presenting search results in accordance with the version-intent, in accordance with an embodiment of the present invention.

With reference now to FIG. 5, a flow diagram is provided that illustrates an exemplary method 500, in accordance with an embodiment of the present invention, for identifying queries having a version-intent and presenting search results in accordance with the version-intent. As indicated at block 510, a search query is received. It then is determined (for instance, utilizing the query classifier 220 of FIG. 2) that at least a portion of the received search query has a version-intent indicative of a particular version associated with a subject of the search query, as indicated at block 512. A plurality of search results that are ranked for presentation (e.g., utilizing the document ranking engine 224 of FIG. 2), at least in part, based on the particular subject-version indicated by the version-intent is presented, as indicated at block 514. This is shown with reference to the screen display 700 of FIG. 7.

Figure 7:
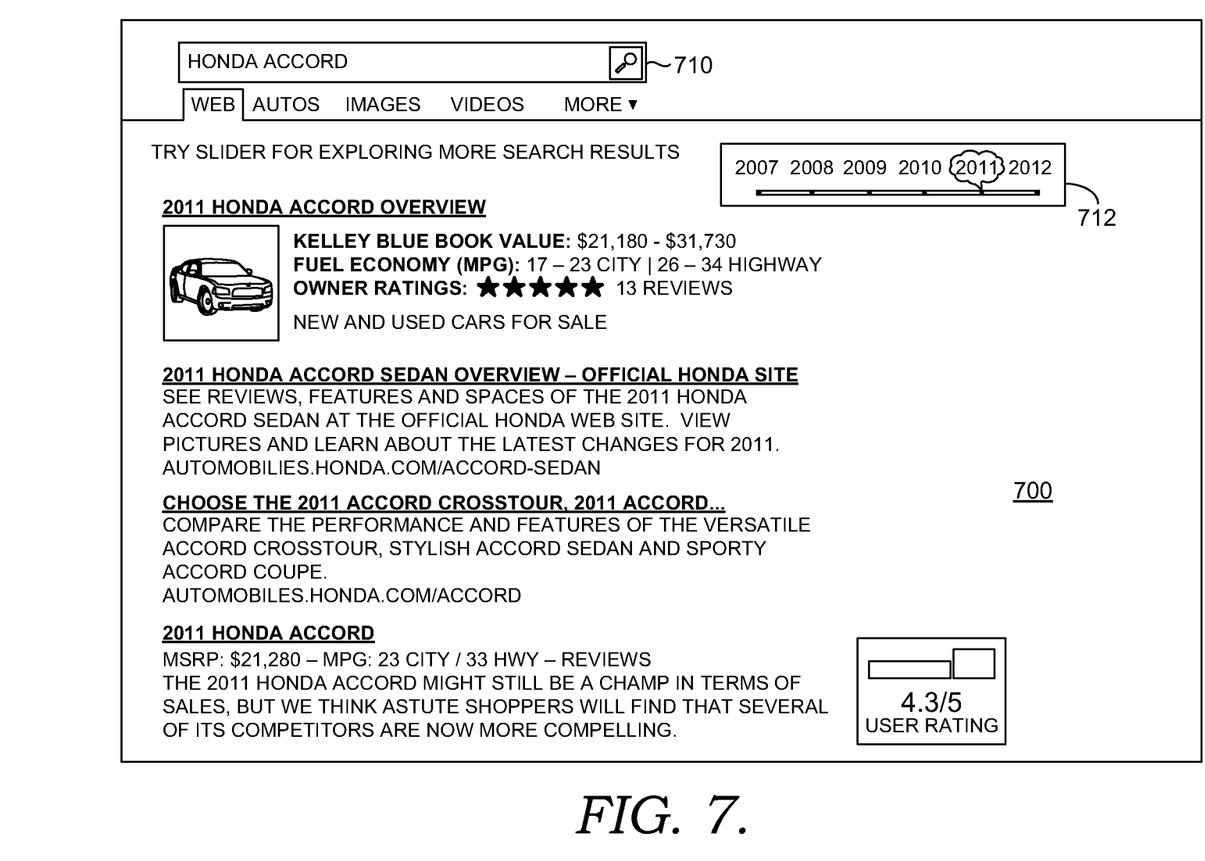
FIG. 7 is a schematic diagram showing an exemplary screen display of a Search Engine Results Page (SERP) determined in accordance with an embodiment of the present invention.

FIG. 7 is a schematic diagram showing an exemplary screen display 700 of a Search Engine Results Page (SERP) determined in accordance with an embodiment of the present invention. As illustrated, the search query "HONDA ACCORD" has been inputted into a search box 710 capable of receiving textual input. Returning to the above example, HONDA ACCORD is a query determined to have a version-intent as the exemplary query logs of Tables I and II indicate that multiple version of HONDA ACCORD exist. However, no explicit version-intent is present in the query. In accordance with embodiments hereof, such implicit version-intent is defaulted to a latest or most-recent version of the subject of the query. As such, assume that the query "HONDA ACCORD" was inputted in March of 2011. Accordingly, the latest or most recent version of HONDA ACCORD is 2011 and the desired version-intent is presumed to be such. Thus, the search results presented are ranked, at least in part, based upon the implicit version desired, "2011."

Returning to FIG. 5, also presented is a user-manipulatable tool, manipulation of which permits a user to change the version-intent to be indicative of a version associated with the subject of the search query other than the particular version. This is indicated at block 516. In embodiments, the user-manipulatable tool permits alpha-numeric or textual input of a desired version other than the particular version. In other embodiments, the user-manipulatable tool visually indicates at least one version associated with the subject of the search query other than the particular version. Any and all such variations, and any combination thereof, are contemplated to be within the scope of embodiments of the present invention. In the screen display 700 of FIG. 7, the user-manipulatable tool is shown as reference numeral 712 and indicates the default or presumed version-intent "2011." The user-manipulatable tool 712 is an example of a tool that visually indicates appropriate subject-versions.

Figure 8:
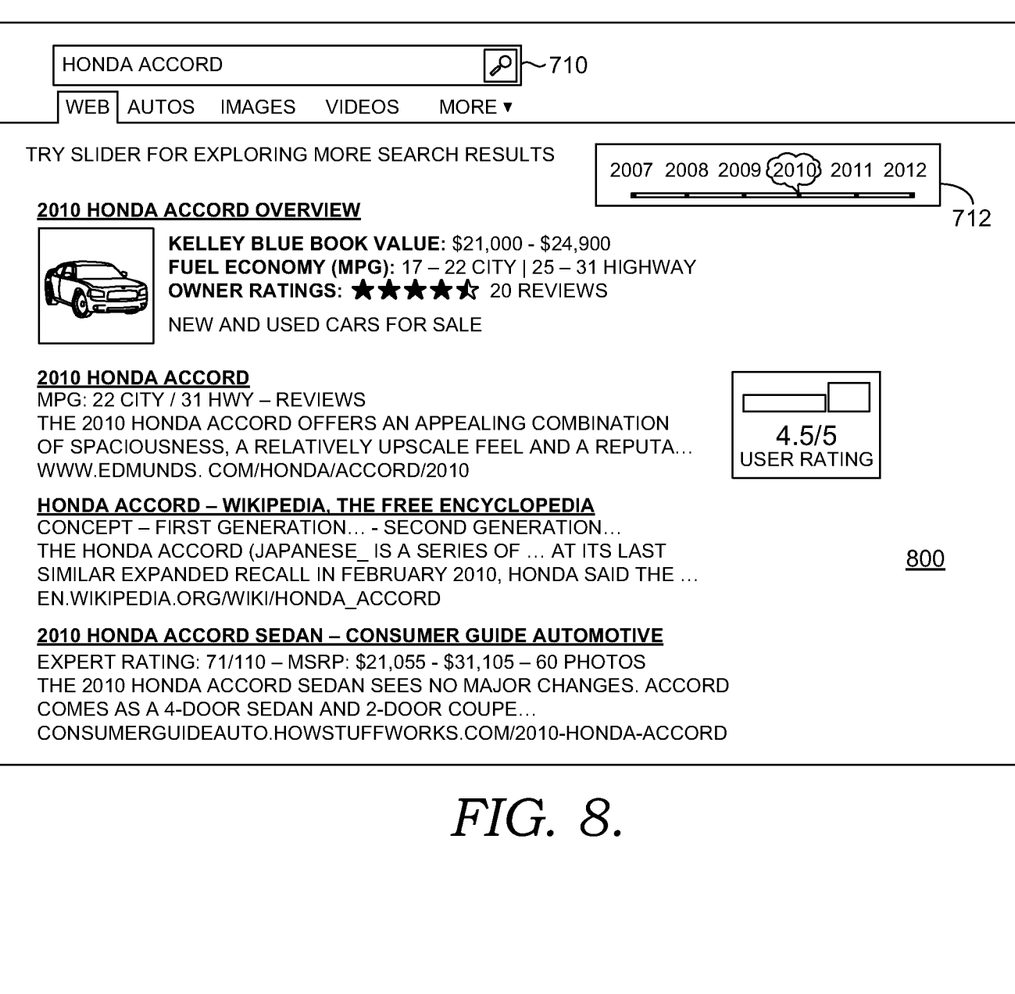
FIG. 8 is a schematic diagram showing another exemplary screen display of a SERP determined in accordance with an embodiment of the present invention.

With reference back to FIG. 5, upon receiving an indication of a change to the version-intent associated with a subject of an inputted query, the query results presented are changed or altered such that a second plurality of search results that are ranked for presentation, at least in part, based on the newly-indicated subject-version indicated by the changed version-intent, is presented. This is shown with reference to the screen display 800 of FIG. 8. As illustrated, the version-intent indication has been changed via the user-manipulatable tool 712 to designate the version "2010" rather than "2011." In accordance with such change, the search results have been changed such that they are ranked, at least in part, utilizing the changed version-intent.

Figure 6:
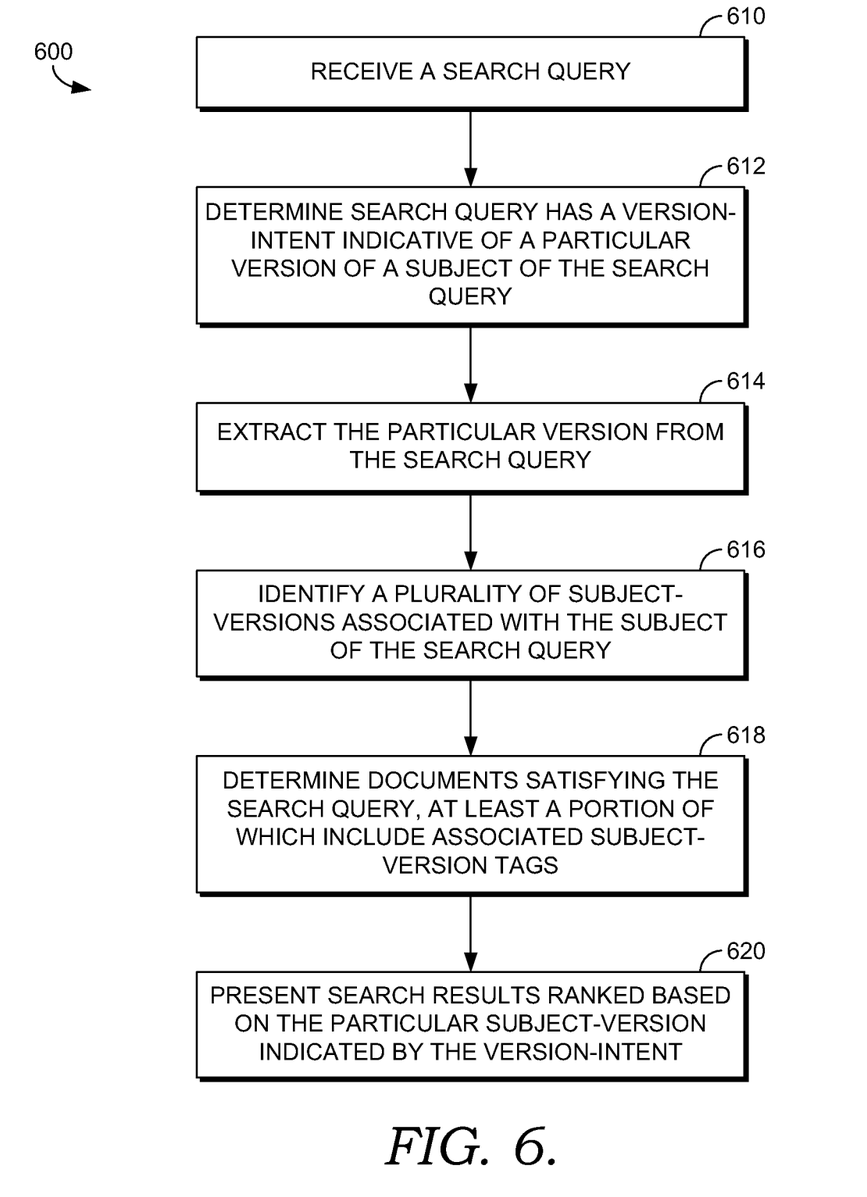
FIG. 6 is a flow diagram showing an exemplary method for identifying queries having an implicit version-intent and presenting search results in accordance with the most relevant version-intent, in accordance with an embodiment of the present invention.

Turning now to FIG. 6, a flow diagram is provided that illustrates another exemplary method 600 for identifying queries having an implicit version-intent and presenting search results in accordance with the most relevant (e.g., latest or most recent version of the subject of the query) version-intent, in accordance with an embodiment of the present invention. As indicated at block 610, a search query is received. It is then determined that at least a portion of the received search query has a version-intent indicative of a particular version associated with a subject of the search query, as indicated at block 612. The particular subject-version associated with the subject of the search query is extracted there from, as indicated at block 614. As indicated at block 616, a plurality of subject-versions associated with the subject of the search query is identified. One or more documents satisfying the received search query are determined, at least a portion of which have one or more associated subject-version tags. This is indicated at block 618. A plurality of search results is then presented, the search results being ranked for presentation, at least in part, based on the particular subject-version indicated by the version-intent, as indicated at block 620.

As can be understood, embodiments of the present invention provide systems and methods for identifying search queries that have an associated version-intent and presenting results to such search queries in accordance with the associated version-intent. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 300 of FIG. 3, the method 400 of FIG. 4, the method 500 of FIG. 5, and the method 600 of FIG. 6 are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. A method for identifying queries having version-intents and presenting relevant search results in accordance with such version-intents, the method comprising:
   receiving a search query;
   determining that at least a portion of the search query has a version-intent indicative of a particular subject-version associated with a subject of the search query, the determining comprising:
      comparing terms of the search query with information stored in a query store;
      determining that that the compared terms of the search query has a version-intent stored in the query store; and
      identifying the particular subject version for the version-intent stored in the query store;
   presenting a plurality of search results that are ranked for presentation, at least in part, based on the particular subject-version indicated by the version-intent, the presenting comprising ranking the plurality of search results based on subject-version tags associated with the particular subject-version; and
   presenting a user-manipulatable tool, manipulation of which permits a user to change the version-intent to be indicative of a subject-version associated with the subject of the search query other than the particular subject-version.

2. The method of claim 1, wherein determining that the at least a portion of the search query has the version-intent indicative of the particular subject-version associated with the subject of the search query comprises determining that the search query contains at least one query string that explicitly indicates the particular subject-version.

3. The method of claim 1, wherein determining that the at least a portion of the search query has the version-intent indicative of the particular subject-version associated with the subject of the search query comprises referencing query log data to identify that the search query contains at least one query string that implicitly indicates the particular subject-version.

4. The method 3, wherein the implicitly-indicated particular subject-version is at least one of a latest version associated with the subject of the search query and a most popular version associated with the subject of the search query.

5. The method of claim 1, wherein determining that the at least a portion of the search query has the version-intent indicative of the particular subject-version associated with the subject of the search query comprises determining that the search query contains at least one query string indicative of a relative subject-version, and wherein the method further comprises assigning a fixed subject-version to the relative subject-version.

6. The method of claim 1, wherein the user-manipulatable tool visually indicates at least one subject-version associated with the subject of the search query other than the particular subject-version.

7. The method of claim 1, further comprising:
   receiving an indication of a second version-intent indicative of a second subject-version associated with the subject of the search query; and
   presenting a second plurality of search results that are ranked for presentation, at least in part, based on the second subject-version indicated by the second version-intent.

8. The method of claim 7, wherein receiving the indication of the second version-intent comprises receiving the indication of the second version-intent via the user-manipulatable tool.

9. The method of claim 1, wherein presenting the plurality of search results comprises presenting the plurality of search results, at least a portion of which includes one or more subject-version tags, wherein each subject-version tag of the one or more subject-version tags is indicative of a certain subject-version associated with the subject of the search query, and wherein the plurality of search results is ranked, at least in part, utilizing the subject-version tags.

10. A method for identifying queries having a version-intents and presenting relevant search results in accordance with such version-intents, the method comprising:
- receiving a search query;
- determining that at least a portion of the search query has a version-intent indicative of a particular subject-version associated with a subject of the search query, the determining comprising:
  - comparing terms of the search query with information stored in a query store; and
  - determining that that the compared terms of the search query has a version-intent stored in the query store;
- extracting, from the search query, the particular subject-version associated with the subject thereof;
- identifying a plurality of subject-versions associated with the subject of the search query, wherein the plurality includes the particular subject-version extracted from the search query;
- determining one or more documents that satisfies the received search query, wherein at least a portion of the one or more documents has one or more subject-version tags associated therewith; and
  - presenting a plurality of search results that are ranked for presentation, at least in part, based on the particular subject-version indicated by the version-intent, the presenting comprising ranking the plurality of search results based on the one or more subject-version tags.

11. The method of claim 10, wherein the method further comprises presenting a user-manipulatable tool, manipulation of which permits a user to change the version-intent to be indicative of one of the plurality of subject-versions associated with the subject of the search query other than the particular subject-version.

12. The method of claim 10, wherein determining that the at least a portion of the search query has the version-intent indicative of the particular subject-version associated with the subject of the search query comprises determining that the search query contains at least one query string indicative of a relative subject-version, and wherein the method further comprises assigning a fixed subject-version to the relative subject-version.

13. A system for identifying queries having version-intents and presenting relevant search results in accordance with such version-intents, the system comprising:
- a query store; and
- a search server comprising a query classifier;
  - wherein the search server:
    - receives a search query;
    - determines that at least a portion of the search query has a version-intent indicative of a particular subject-version associated with a subject of the search query, the determining comprising:
      - comparing terms of the search query with information stored in the query store;
      - determining that that the compared terms of the search query has a version-intent stored in the query store; and
      - identifying the particular subject version for the version-intent stored in the query store;
    - presents a plurality of search results that are ranked for presentation, at least in part, based on the particular subject-version indicated by the version-intent, the presenting comprising ranking the plurality of search results based on subject-versions tags associated with the particular subject-version; and
    - presents a user-manipulatable tool, manipulation of which permits a user to change the version-intent to be indicative of a subject-version associated with the subject of the search query other than the particular subject-version.

14. The system of claim 13, wherein the search server is in communication with the query store.

15. The system of claim 14, wherein the subject-version is implicit in the search query.

16. The system of claim 13, wherein the search server is in communication with a document index, and the document index associates search results in the document index having a known subject-version association with a subject-version tag indicative of the subject-version of the search result.

17. The system of claim 16, wherein the search server further comprises a document ranking engine, the document ranking engine configured to rank the plurality of search results at least in part based on whether the subject-version tag associated with a search result in the document index matches the subject-version of the search query.

18. The system of claim 16, wherein the document index is configured to store keyword-based classification information about the search results.

19. The system of claim 17, wherein the document index is configured to store more than one subject-version tag for a search result if the search result is associated with more than one subject-version.

20. The system of claim 19, wherein the document ranking engine is configured to rank more highly search results having a subject-version tag matching the subject-version of the search query than search results which lack a subject-version tag matching the subject-version of the search query.

* * * * *